United States Patent [19]

Moss

[11] 4,041,141

[45] Aug. 9, 1977

[54] PRODUCTION OF ELEMENTAL SULPHUR

[75] Inventor: Gerald Moss, Oxford, England

[73] Assignee: Exxon Research and Engineering Company, Linden, N.J.

[21] Appl. No.: 657,539

[22] Filed: Feb. 12, 1976

[30] Foreign Application Priority Data

Feb. 3, 1975  United Kingdom .................. 4486/75

[51] Int. Cl.² ........................................... C01B 17/06
[52] U.S. Cl. ................................... 423/571; 423/569; 423/DIG. 16
[58] Field of Search ............... 423/567, 569, 570, 571, 423/659 F, 153, 154

[56] References Cited

U.S. PATENT DOCUMENTS

| | | | |
|---|---|---|---|
| 1,182,951 | 5/1916 | Wierum | 423/569 |
| 1,908,873 | 5/1933 | Tyrer | 423/569 |
| 2,002,860 | 5/1935 | Levy | 423/569 |
| 2,040,682 | 5/1936 | Bacon et al. | 423/570 |
| 2,483,485 | 10/1949 | Barr | 426/659 F |
| 2,666,526 | 1/1954 | Odell et al. | 423/659 F |
| 3,781,445 | 12/1973 | Moss et al. | 423/574 |
| 3,810,972 | 5/1974 | Humphrey et al. | 423/569 |

FOREIGN PATENT DOCUMENTS

| | | | |
|---|---|---|---|
| 2,993 | 11/1865 | United Kingdom | 423/569 |
| 1,135,439 | 12/1968 | United Kingdom | 423/569 |

*Primary Examiner*—G. O. Peters
*Attorney, Agent, or Firm*—Wayne Hoover

[57] ABSTRACT

Elementary sulfur is obtained from sulfur-containing materials which release sulfur oxides ($SO_x$) in the presence of oxygen by fluidizing such materials in a bed with an oxygen-containing gas (e.g., air), and passing the resulting $SO_x$-containing gases through a bed (preferably fluidized) of carbonaceous or carbon-containing solids (such as coke or coal) at an elevated temperature to reduce $SO_x$ to elemental sulfur, the bottom of the bed of carbonaceous or carbon-containing solids being at about the level of the top of the bed of sulfur-containing materials.

13 Claims, 3 Drawing Figures

PRODUCTION OF ELEMENTAL SULPHUR

The present invention relates to the production of elemental sulphur.

It is known to produce elemental sulphur by contacting an oxide of sulphur ($SO_2$ and/or $SO_3$), hereinafter designated "$SO_x$", with a reducing agent such as carbon at elevated temperatures, the carbon being oxidized to carbon oxide(s) in the course of the reaction. However, difficulties arise in ensuring that the temperature of contact of the $SO_x$ and carbon is adequately high to give an efficient and economic conversion of $SO_x$ to sulphur. In order to maintain a temperature which is adequately high, oxygen-containing gas (e.g. air) is injected into the conversion vessel to produce heat by oxidation of the carbon. Since carbon is consumed merely to maintain the reaction temperature, this clearly has an adverse effect on the overall economy of the process.

Processes are known for producing substantially oxygen-free $SO_x$ containing gas streams. In one such process, an $SO_x$-containing flue gas is contacted with copper oxide, the latter fixing the $SO_x$ as $CuSO_4$ in the presence of the oxygen which is normally present in flue gas, and the $CuSO_4$ is treated with reducing gas to recover CuO for further use, $SO_2$ (and some $SO_3$) being liberated. In another process, a sulphur-containing fuel (e.g. fuel oil and/or coal) is partially or fully combusted in a fluidized bed of particles containing calcium oxide to produce either a substantially sulphur-free combustible fuel gas or a substantially sulphur-free flue gas, the sulphur being fixed in the particles as either CaS or $CaSO_4$. The particles are then exposed to either an oxygen-containing gas (in the case of CaS) or a reducing atmosphere (in the case of $CaSO_4$) and CaO is thereby regenerated with the liberation of $SO_2$ (and possibly some $SO_3$), the regenerated CaO being reused for fixing further quantities of sulphur from sulphur-containing fuel. Processes of this latter type are described in U.K. patent specification Nos. 1,183,937 and 1,336,563.

The $SO_x$-containing gas streams from the foregoing (and other) processes are relatively concentrated and can be arranged to be substantially free of oxygen, and it has been proposed that they be passed upwardly into a discrete vessel containing a non-fluidized bed of crushed coal (one-fourth to one-half inch size approximately). In order that the temperature of contact of the $SO_x$ and coal is adquately high for the reduction of $SO_x$ to elemental sulphur to proceed at an acceptable rate, oxygen-containing gas (such as air) must be injected into the vessel to oxidize coal to supply the necessary heat. Obviously, the consumption of coal for temperature maintenance has an adverse effect on the economics of practising this method of converting $SO_x$ to elemental sulphur. In addition to the foregoing drawback which increases the operating costs, there is also additional capital expenditure for the vessel, the land space and volume occcupied thereby, and the ducting for the $SO_x$-containing gases, and the provision of fans to supply the oxygen-containing gas to the interior of the vessel.

It has now been discovered that elemental sulphur can be recovered efficiently and cheaply more or less directly from sulphur-containing solid materials, such as those previously mentioned (inter alia), by a simple expedient which avoids the drawbacks of prior processes, and in accordance with one aspect of this invention, particles containing at least one solid compound of sulphur are treated, and preferably fluidized, in a lower bed under such conditions that sulphur is liberated as $SO_x$, and the $SO_x$ is passed upwardly into an upper bed at an elevated temperature and containing char (as hereinafter defined), which preferably is fluidized by $SO_x$-containing gas from the lower bed, whereby at least some $SO_x$ is reduced to elemental sulphur, the char having a density which is lower than the density of the particles in the lower bed whereby the bottom of the upper bed is substantially at the level of, and in contact with, the top of the lower bed.

Because of the difference in densities of the char and the particles, the upper bed of char floats upon the lower bed of particles, the char forming a stratum effectively commencing at the top of the lower bed. There may be a region between the upper and lower beds where intermingling of the char and the particles takes place to some extent.

The term "char" herein comprehends (inter alia) coal, lignite, shale and solid pyrolysis products thereof (e.g. coke, coal char), charcoal, petroleum coke (including substances having petroleum coke on the surface and/or within pores thereof) and any mixture of the foregoing.

Although the invention can be performed batchwise, it is preferred to operate continuously by passing particles containing solid compound(s) of sulphur into the lower bed, and passing char or material which forms char at the operating conditions, into the upper bed. In such a continuous operation, particles are preferably removed from the lower bed after a period therein so that a build-up of sulphur-depleted particles is avoided. The removal of particles is preferably effected from a part remote from that at which particles enter.

Depending on the material of the char, it may or may not be necessary to remove "spent" char since in the case where the char is pulverized coal or coke, the reaction with $SO_x$ leaves a residue of ash which is elutriated out of the upper bed and entrained in the outgoing stream of gas/vapour. However, in the case of char on "inert" low density solid supports such as petroleum coke on lightweight porous refractory brick fragments or pumice, made by pyrolyzing a flowable petroleum material (e.g. a heavy oil, residuum, or cycle oil from catalytic cracking) in contact with the lightweight brick fragments or pumice, it may be desirable to bleed some support solids from the upper bed, and to replace the support solids by a make-up of fresh solids. The bleed of support solids may contain recoverable metals such as vanadium originally present in the petroleum material. The amount of char present in the upper bed is preferably maintained approximately constant by passing char or char-forming material preferably into the upper bed to compensate for that lost by reaction with the $SO_x$.

It will be appreciated from the foregoing that the conversion of sulphur-containing solid components to $SO_x$ and the conversion of $SO_x$ to elemental sulphur may all take place in a single reaction vessel operating at whichever conversion temperature is critical for either conversion to take place, and in the substantial absence of any oxygen which might preferentially react with the char. Accordingly, relative to prior processes, captial costs are reduced, and operating efficiencies and conversions are increased.

Some non-limitative examples of the invention are now described with reference to the accompanying drawings, wherein.

Figure 1:
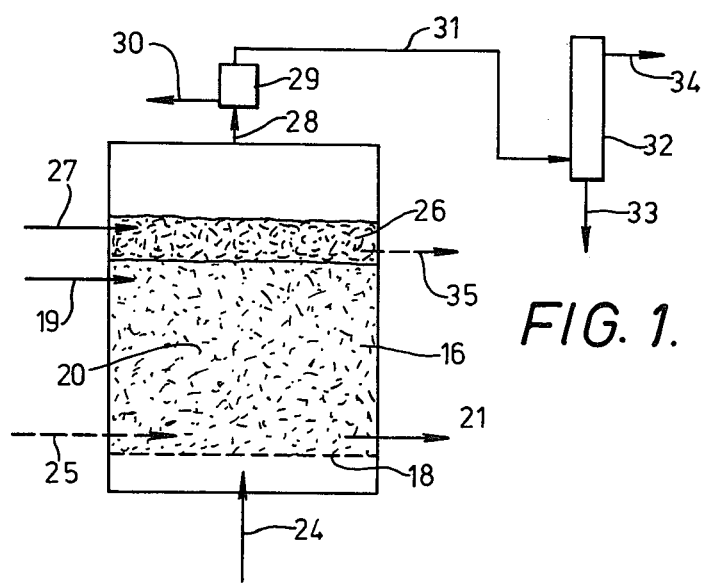
FIG. 1 is a flow diagram of the principal parts of one form of apparatus for performing the invention.

In FIG. 1, a vessel 16 has a gas distributor 18 above its base, and solid particles of sulphur-containing material are passed into the vessel 16 from a transfer conduit 19 to form a bed 20 which is supported above the distributor 18. It the process is to be operated continuously, as would commonly be the case, processed solid material is removed from the bed 20 via a conduit 21 located remotely from conduit 19 to maintain a substantially constant inventory of sulphur-containing material. As depicted, the conduit 19 passes material into the top region of the bed 20 and conduit 21 permits the exiting of material from the bottom region of the bed, but these relative positions are not limiting. What is generally important is that the entering material should have an adequate residence time for processing in the bed 20 before removal, and this can be ensured by any expedient such as the provision of baffles to cause particles to follow an elongated path between the conduit 19 and the conduit 21.

A treating gas is passed from line 24 into the vessel 16 beneath the distributor 18 so as to pass relatively uniformly through the bed 20. Preferably, the treating gas fluidizes the particles in the bed 20.

The nature of the treating gas depends upon the chemical composition of the sulphur-containing particles. If the particles contain a metal sulphide such as zinc blende (ZnS), copper pyrites (CuS) or calcuim sulphide (CaS), inter alia, the treating gas is preferably air which may have been preheated in a preheater (not shown). The reaction between metal sulphides (MS) and oxygen is usually exothermic, and provided the temperature and amounts of oxygen are within certain ranges which can be determined by those skilled in the art, the main reaction products are sulphur oxide (SOx) and the metal oxide (MO), possibly with other products such as metal sulphates. If the particles contain a metal sulphate (e.g. $CuSO_4$, $CaSO_4$ etc), the treating gas may be at least partially reducing; that is to say it may have reducing properties in some regions of the bed 20 and neutral or even oxidizing properties elsewhere in the bed. A non-uniform treating gas of this type is preferably formed by burning a fuel from line 25 within the bed 20 in oxygen-containing gas line 24. Gas mixing in fluidized beds tends to be relatively poor, and if the combustion in the vicinity of the fuel injection region is effected with less than the stoicheometric amount of oxygen, part of the atmosphere in the bed 20 will be reducing. If the overall amount of oxygen entering bed 20 is significantly in excess of the stoicheometric requirement, the fuel will tend to be completely burned within the bed and there will be no reduction of the metal sulphate. A non-uniform reducing treating gas tends to avoid the formation of metal sulphides since the good particle circulation in a fluidized bed transfers any sulphides through any oxidizing regions of the bed where the sulphides are either converted back to sulphate and may subsequently be reduced in a reducing region, or oxidized to the metal oxide with the release of SOx. Alternatively, a hot mildly reducing gas may be introduced via line 24 to convert the sulphate to oxide with the release of SOx. The sulphur oxide will be predominantly $SO_2$ with some $SO_3$, but in the presence of an excess of oxygen, the proportion of $SO_3$ can be increased by catalytic effects from the bed materials.

In order to maintain an adequately high temperature in the bed 20, a fuel (which may be a combustible gas or a hydrocarbon liquid or a solid fuel) may be injected from line 25 into the bed 20.

It is preferred that the gas reaching the top of bed 20 is substantially free of oxygen so that it contains only sulphur oxide and inerts such as nitrogen, and if fuel is supplied from line 25, the fuel combustion products such as $CO_2$ and $H_2O$.

At the top of bed 20 is the bottom of a bed 26 of char, as hereinbefore defined, which preferably is fluidized by the upwardly passing gas. The reaction conditions in the bed 20 must be so arranged that the upwardly passing gas is at a temperature at which sulphur oxide reacts with the char to give, inter alia, elemental sulphur and carbon oxide(s) ($CO_2$ and/or CO), preferably $CO_2$. The minimum reaction temperature depends on the nature of the char. For example, if the char is a reactive carbonaceous material such as petroleum coke, on or mixed with a suitable reaction promoter, such as bauxite, the reaction may proceed at temperatures as low as 310° C. The maximum reaction temperature is limited by the materials of construction of the vessel 16, and by economic factors. The presence of free oxygen in the gases passing through the bed 26 consumes char by oxidiation with the evolution of considerable amounts of heat without contributing to the yield of elemental sulphur, and accordingly, the concentration of free oxygen should be as low as possible. The maximum temperature in bed 26 may be as high as 1350° C. However, it is preferred to employ temperatures in the range of 600° C to 1250° C and to at least some extent, the temperature in the bed 26 will depend on the temperature of the gas passing into the bottom of the bed 26 from the top of bed 20, and this in turn will depend on the process conditions in bed 20.

The gas and vapour products of the reaction in bed 26 are recovered in line 28, passed through solids removal enquipment 29, such as a cylone and/or precipitator and/or filter, the thus removed solids being recovered or rejected via line 30, and the substantially solids-free products are passed via line 31 to a sulphur-recovery condenser 32, sulphur being recovered via line 33 and gases and vapours which are substantially free of elemental sulphur passing out of condenser 32 via line 34. Any uncoverted residue of sulphur oxide or any other sulphur moiety may be removed from the gas/vapour stream in any known manner before the stream is vented to atmosphere if the sulphur concentration thereof is unacceptably high.

In order to maintain the amount of char in the bed 26, additional char or char-forming material may be passed into the bed 26 via line 27. The activity of the bed 26 may be maintained by removing material from the bed 26 via line 35. The removed material may be ash or a substrate or support on which the reactive char was deposited.

As indicated above, the char may be coke, or coal, preferably a coal which pyrolyzes to a highly porous coke, or the char may be formed in situ by injecting a liquid hydrocarbon material, preferably having a high carbon to hydrogen atomic ratio, such a heavy cycle oil and/or bottoms from thermal and catalytic cracking operations, asphalts and pitches, onto a porous, low density substrate or support. For hydrocarbon materials of lower carbon to hydrogen atomic ratio, it is preferred but not essential to form the coked substrate or support outside the vessel 16 in a separate coking unit since the hydrogen-rich vapours and gases produced by coking or pyrolyzing such materials in the bed 26 could reduce at least some of the sulphur oxide passing conntact therewith to hydrogen sulphide which would require further treatment to recover elemental sulphur.

Figure 2:
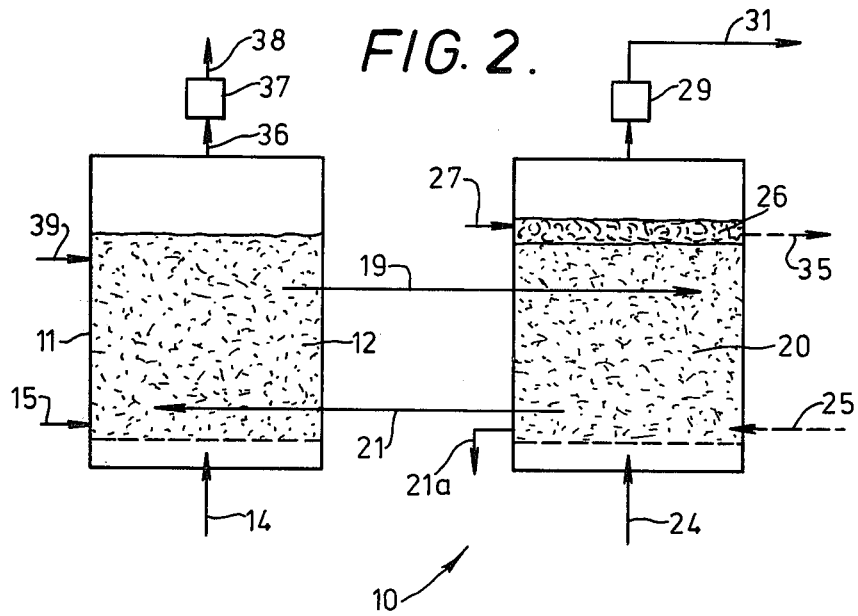
FIG. 2 is a flow diagram of the principal parts of another form of apparatus for performing the invention.

FIG. 2 shows the apparatus of FIG. 1 incorporated as part of a fluidized bed combustion system, generally designated by reference 10.

The system 10 comprises a combustion vessel 11 in which a bed 12 of lime or calcined dolomite particles are supported on an air distributor 13 spaced from the base of the vessel 11. The particles of the bed 12 are fluidized by air supplied from line 14 which passes into the base of the bed 12 from distributor 13. A sulphur containing fuel, such as fuel oil or coal or a coal/oil slurry, is passed into the bed 12 from one or more injectors 15 (only one being shown), and the fuel is combusted at temperatures in the range 750° C to 1250° C, preferably 800° to 1000° C, more preferably 850°–950° C, e.g. about 870° C, in the bed to produce heat which is removed by heat exchange coils (not shown) immersed in the bed 12, and substantially sulphur-free flue gas, the sulphur of the fuel being fixed in the particles as $CaSO_4$. The flue gas escapes upwardly via line 36 to de-dusting equipment 37 and may pass via line 38 to conventional heat recovery equipment (not shown).

$CaSO_4$ containing particles are passed via a line 19 into the bed 20 and a fuel such as a hydrocarbon fuel oil is passed from line 25 into the bed 20 slightly in excess of the stoicheometric equivalent of oxygen entering from line 24 so that a non-uniform atmosphere, which on an overall basis is preferably mildly reducing, is formed in the bed 20.

At least some $CaSO_4$ is converted to CaO and $SO_2$ is liberated. Particles containing thus regenerated CaO are returned via a line 21 to the bed 12 for further use in fixing sulphur from further quantities of sulphur-containing fuel.

In order to maintain the sulphur-fixing activity of the bed 12, fresh particles of CaO, or $CaCO_3$, (limestone) or dolomite are added via line 39, and a bleed of particles via line 21a maintains a substantially constant inventory of particles in the system 10. The temperature in the bed 20 depends on the type of fuel passed thereinto from line 25 and on the relative quantities of the fuel and oxygen in the bed, but good conversions of $CaSO_4$ to CaO and SOx are obtained at 1000° C to 1350° C, e.g. about 1070° C.

The SOx-containing gases pass upwardly in bed 20 and into bed 26 where the SOx is reduced to elemental sulphur at about the same temperature as the operating temperature of bed 20 or slightly higher.

Figure 3:
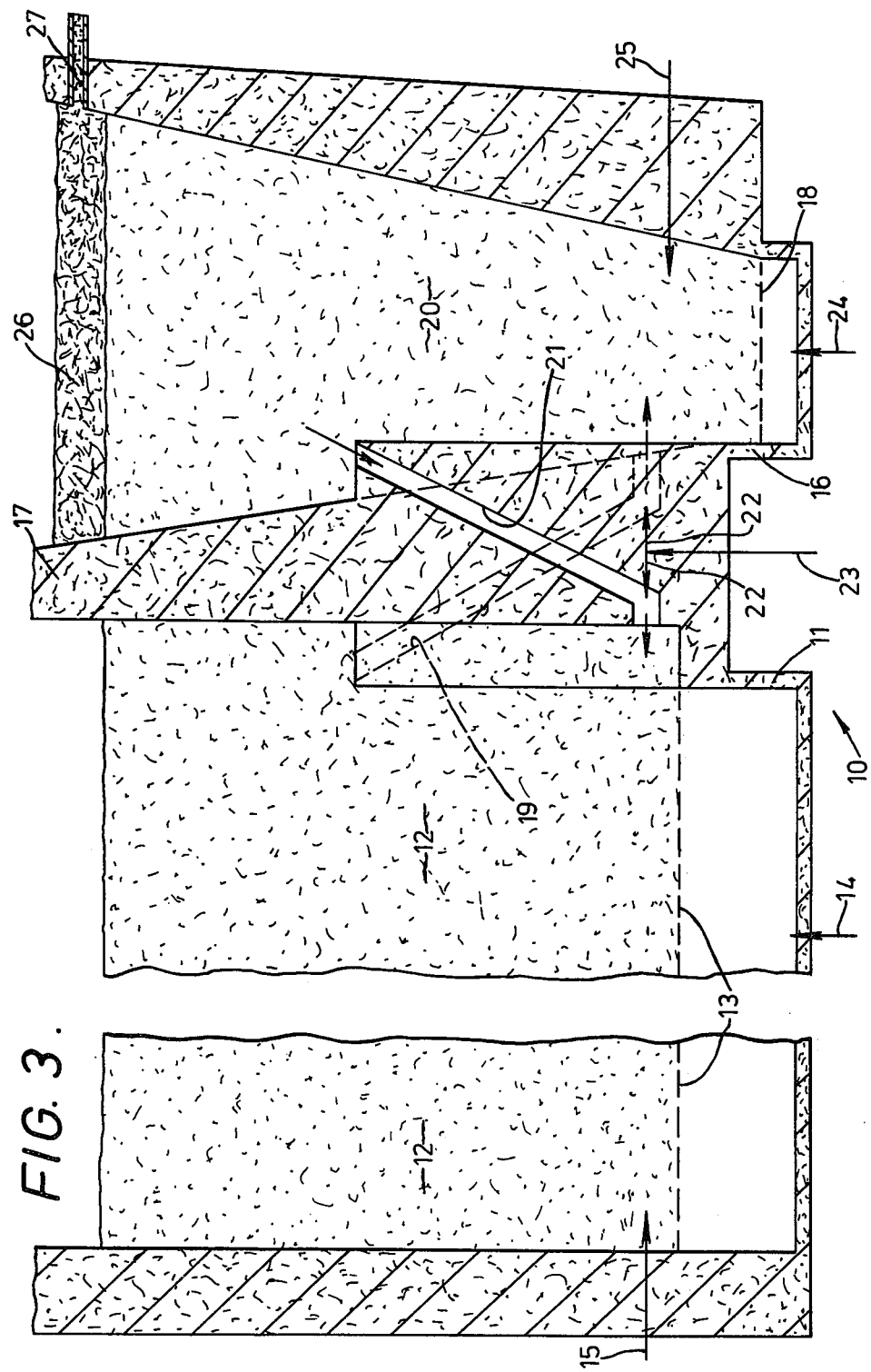
FIG. 3 is a cross-sectional view showing in greater detail the principal parts of a preferred apparatus of the type illustrated in FIG. 2.

Reference is now made to FIG. 3 of the drawings wherein the vessels 11 and 16 are seen to be formed from a refractory material such as cast refractory cement or blocks of refractory cement. The system 10 is formed as a single unit instead of as two distinct vessels as shown in FIG. 2, although in very large plant, it may be preferred to employ two discrete vessels.

Adjacent to the combustion vessel 11 is the vessel 16, constituting a regenerator, there being a separating wall 17 between the vessel 11 and regenerator 16. The regenerator 16 has an air distributor 18 above its base, and a bed 20 of particles is supported on the distributor 18. A transfer duct 19 extends from an upper region of the bed 12 downwardly through the separating wall 17 and communicates via an elbow section with a lower region of the bed 20 some distance (e.g. 1 to 2 feet) above the distributor 18. Similarly, a transfer duct 21 extends from an upper region of the bed 20 downwardly through the wall 17 and communicates via an elbow section with a lower region of the bed 12 more or less immediately above the distributor 13. A gas conduit 22 is connected into the adjacent bottom ends of the two elbow sections, and an inert gas supply line 23 is connected to the conduit 22. Pulses of inert gas (e.g. cooled flue gas) are supplied in line 23 causing particles in the transfer ducts 19, 21 to be pneumatically transported intermittently out of the ducts and into the beds 20 and 12 respectively. Thus particles ccontaining $CaSO_4$ are transferred to bed 20 from bed 12, and particles are transferred from bed 20 to bed 12.

The particles in bed 20 are fluidized by air from line 24, and a fuel (such as natural gas, a fuel oil or coal) is passed into bed 20 from one or more injectors 25 (only one being depicted), the amount of oxygen preferably being no more than sufficient to combust the fuel, and more preferably being sufficient to provide mild reducing cconditions (on a nett basis) in the bed 20. If the amount of air to provide the preferred quantity of oxygen is inadequate to fluidize the bed 20, flue gas or steam may be included with the air to increase the superficial gas velocity in the bed 20. The $CaSO_4$ is converted, under these conditions, principally to CaO which is returned via duct 21 to bed 12 for re-use, with the liberation of sulphur mainly as $SO_2$. The temperature in bed 20 may be from 900°–1350° C, preferably 1050°–1090° C.

Floating on the top of the bed 20 is a fluidized bed 26 of char, as hereinbefore defined. This may be formed by passing, e.g. coal particles, via injection port 27 into regenerator 24 at a level just above the top of bed 20. The coal particles, at the temperature of the bed 20, are pyrolyzed and swollen to a porous low density coke which reacts exothermically with the $SO_x$ to reduce the latter to elemental sulphur, the coke being converted to carbon monoxide and/or dioxide. The gas stream containing elemental sulphur is passed, inter alia, through equipment (not shown) for recovering sulphur. Such equipment may include a condenser of the type described in U.K. Patent Specification No. 1,331,238.

In processes wherein fuel injected at 15 is converted to substantially sulphur-free combustible gas by combustion in bed 12 with insufficient air for complete combustion, the sulphur of the fuel uis fixed in the particles of the bed 12 as CaS. The CaS-containing particles are transferred via duct 19 to bed 20, and fluidized in bed 20 by air (possibly with a supplement of flue gas if the superficial velocity in bed 20 would otherwise be too low for adequate fluidization), the oxygen supplied by the air being preferably no more than sufficient, and more preferably slightly less than sufficient, to convert the CaS to CaO by the following reactions:

$$2CaS + 3O_2 \rightarrow 2CaO + 2SO_2$$
$$CaS + 2O_2 \rightarrow CaSO_4$$
$$3CaSO_4 \rightarrow 4CaO + 4SO_2$$

Preferably the foregoing reactions, which overall are exothermic, are performed at temperatures in the range 900°–1350° C, more preferably 950°–1200° C.

The regenerated CaO-containing particles are returned via duct 21 to bed 12 for further use.

The $SO_2$ produced in the foregoing reactions passes through the "floating" bed 26 of char and at least some is converted to elemental sulphur.

It is possible to inject the char or char-forming material into the regenerator bed 20, particularly in the instance where the sulphur is initially fixed as $CaSO_4$ since this might advantageously promote the conversion of $CaSO_4$ to CaO. However, it is nevertheless desirable that the char, or char-forming material, in this mode be of less density than the other particles forming the bed 20 so that the floating bed 26 is formed on the surface of the bed 20.

Since the char has a lower density than the density of the particles forming the regenerator bed 20, it is preferred to form the regenerator bed with a wider cross-section at the level of the bed 26 than in the bed 20 so that there is substantially no tendency for char to sink from the bed 26, where the superficial velocity is relatively low, into the bed 20, where the gas velocity is relatively higher. This may be conveniently arranged by forming the walls of the regenerator bed 20 with an upwardly divergent cross-section, as shown in the diagram.

What we claim is:

1. A method of producing elemental sulphur from a solid compound of sulphur, comprising treating particles ccontaining the said solid compound in a lower fluidized bed under such conditions that sulphur is liberated as SOx, passing the SOx upwardly into an upper fluidized bed at a temperature within the range of 310° to 1350° C. and containing char, (as herein defined), whereby at least some SOx is reduced to elemental sulphur, the char of the upper fluidized bed having a density lower than the density of the particles in the lower fluidized bed, whereby the upper fluidized bed floats upon the lower fluidized bed.

2. A method according to claim 1 in which the char is fluidized by SOx-containing gas from the lower bed.

3. A method according to claim 2 in which particles containing said solid compound of sulphur are passed continuously into the lower bed, and particles depleted in said solid sulphur compound are removed from the lower bed.

4. A method acccording to claim 3 in which at least some of the particles removed from the lower bed are employed to remove and/or fix fulphur from sulphur-containing fuel or flue gas as a solid compound of sulphur.

5. A method according to claim 6 comprising returning particles containing said solid compound of sulphur to the lower bed.

6. A method according to claim 5 in which the solid compound is formed under net reducing condition, and the conditions in the lower bed are oxidizing on a net basis.

7. A method according to claim 5 in which the solid compound is formed under net oxidizing conditions and the conditions in the lower bed are at least partly reducing.

8. A method according to claim 7 in which a fuel is partly burned within the lower bed in the presence of an oxidizing gas thereby to produce an atmosphere of non-uniform composition which is at least partly reducing.

9. A method according to claim 1 in which the said solid compound is a compound of sulphur and zinc, calcium or copper and the temperature in the upper fluidized bed is in the range of 600° to 1250° C.

10. A method according to claim 1 in which the char is formed by contacting a hydrocarbon or hydrocarbonaceous material with a hot substrate or support material within the upper fluidized bed.

11. A method according to claim 10 in which the substrate or support material is selected from bauxite, brick fragments and pumice.

12. A method according to claim 1 in which the char is a coke or semi-coke formed in situ in the upper bed from coal.

13. A method according to claim 1 in which some char is withdrawn from the upper bed and replaced by fresh char.

* * * * *